April 16, 1935.   G. A. GEMMER   1,998,365
STEERING GEAR FOR VEHICLES
Filed Nov. 30, 1934
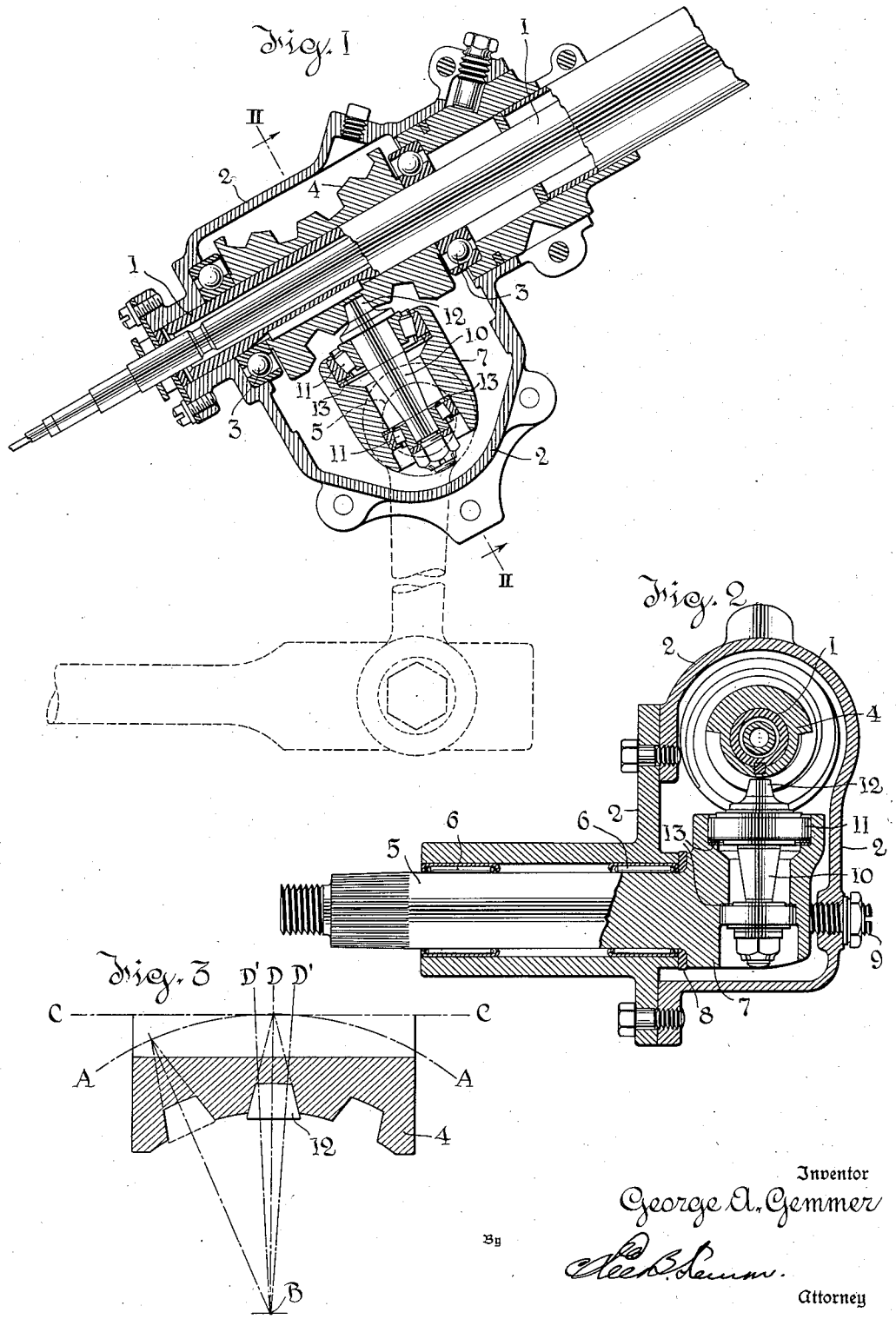
Inventor
George A. Gemmer Patented Apr. 16, 1935

1,998,365

UNITED STATES PATENT OFFICE 1,998,365

STEERING GEAR FOR VEHICLES

George A. Gemmer, West Orange, N. J.

Application November 30, 1934, Serial No. 755,485

3 Claims. (Cl. 74—500)

This invention relates to steering gears for motor vehicles and the like, and particularly to an improved anti-friction gear of the worm type.

The available space in motor car assemblies for mounting a steering gear constitutes a practical limit on the size of the gear and gear housing that may be used. In general, the gear must be mounted in the narrow space between the engine and the side frame or chassis member; and it is one of the objects of this invention to provide a compact and efficient steering gear which is contained in a relatively narrow housing that is easily mounted for use on or removed from a motor vehicle.

It is also a primary object of this invention to provide a compact, heavy-duty gear in which the worm engaging element is constructed as a rolling shaft or spindle that is supported in relatively large bearings. The latter occupy such a position that they may be proportioned and spaced in order to be able to exert their full capacity to resist the maximum loading to which the parts are subjected in the use of the gear.

Another object of this invention is the provision of a steering gear of the worm type in which the relative arrangement of elements is such that friction between the worm and the tooth engaging the worm is materially reduced, and the mechanical advantage of the gear is substantially improved.

It is a further object of this invention to provide a worm gear wherein contact between the worm and the tooth engaging the worm approximates true rolling contact over the most used portion of the range of operation.

Another object of this invention is to provide a steering gear of sturdy construction which will withstand hard usage for long periods of time without requiring replacement or adjustment of the parts, and which will also be of simple design and economical to manufacture.

Other objects and advantages of the invention will become apparent from the following detailed description of the embodiment of the invention shown in the accompanying drawing, wherein, Figure 1 is a sectional side elevation view of a steering gear constructed in accordance with the present invention;

Figure 2 is an elevation view partly in section on the line II—II of Figure 1;

Figure 3 is a diagram illustrating the relation of the tapered surfaces of the pin and the worm groove with respect to the axis of the worm.

Referring to the drawing, which for the purposes of illustration shows a preferred embodiment of the invention, a conventional steering column or shaft is indicated by the numeral 1. This shaft has its lower end housed in a lubricant-tight housing 2 which latter also encloses the novel gearing hereinafter described. The shaft 1 is provided with the bearings 3 which may be of standard design and with an hour-glass worm 4 suitably keyed to the shaft between the bearings 3. An adjustment is provided on the housing for taking up wear or play in the bearings 3. This adjustment is in accord with conventional practice and forms no part of the instant invention.

A horizontal trunnion or rock shaft 5, shown in Figure 2, is also rotatably mounted in the housing 2 on needle roller bearings 6. The axis of the rock shaft 5 is preferably arranged normal to a vertical plane containing the axis of the steering column 1, as clearly shown in Figure 2. Although it is preferable that the rock shaft 5 be mounted in a substantially horizontal position, in some installations it need not be exactly horizontal, and in such case, the plane to which the rock shaft is normal and which contains the steering column axis, would not be a true vertical plane. That end of the rock shaft which extends into the housing 2 is formed with an enlarged head 7 hollowed or cored out in a direction perpendicular to the axis of the rock shaft. A suitable washer or bearing ring 8 is arranged on the rock shaft 5 between the head 7 and the wall of the housing 2. This bearing ring 8 and an adjusting screw 9 on the opposite side of the housing serve to position the rock shaft in the housing so that the axis of the hollowed-out head 7 intersects the axis of the worm 4. This positioning is secured by providing that the ring 8 is of proper thickness and then adjusting the screw 9 to eliminate end-play in the rock shaft movement.

A relatively long shaft or spindle 10 is rotatably mounted in the head 7 on the double thrust bearings 11. The anti-friction bearings 11 are preferably of the roller type adapted to permit free rotation of the spindle 10 about its own axis and to prevent axial movement of the spindle. Ball bearings may be used in place of the roller bearings shown. Because of the relatively large gear ratios utilized in this type of steering gears, the stresses developed in the spindle 10 are large, and require that the spindle be of a size to resist such stresses and be adequately journalled in the rock shaft head 7.

The size of the spindle, and particularly its length, which is not subject to the usual limitations of the practice, by reason of its operation in a substantially vertical plane, permits the use of larger size bearings and their spacing, axially of the spindle, in order to better utilize the individual load carrying capacity of each individual bearing.

The outer rings of bearings 11 are positioned against suitable spaced-apart shoulders on the inner surface of the hollowed-out head 7. Shims 13 may be provided between the bearings 11 and the above-mentioned shoulders to permit axial adjustment of the spindle toward or away from the worm 4.

The upper end of the spindle 10 is provided with a tapered surface 12 in the form of a truncated cone. This conical surface engages the tapered surfaces or sides of the groove of the worm 4. As the worm is rotated by the steering column 1, the spindle pivots about the axis of and turns the rock shaft 5. The latter is provided with a conventional pitman arm secured to its outer end (shown dotted in Figure 1), and a suitable drag link is connected to the pitman arm in accordance with standard practice.

In order to minimize friction between the roller tooth 12 and the worm groove, it is advantageous to approximate as nearly as possible true rolling contact between these two parts. Such rolling contact is obtained when the apex of the conical tooth surface 12 lies on the axis of rotation of the worm 4.

Referring to the diagram shown in Figure 3, it will be noted that the path of movement of the apex of the conical surface 12 is the arc A of a circle whose center is the point B situated on the axis of rock shaft 5. Obviously, the apex of the conical surface 12 cannot lie on the worm axis C at all positions of the gear, since the arc A is not a straight line coincident with the straight line worm axis C. By making the distance between the worm axis C and the rock shaft axis B relatively great, the curvature of the arc A is reduced and the arc A lies relatively close to the straight line worm axis C over a limited range D'—D' of the total range of operation.

The range of operation most used in steering a motor vehicle with this type of a gear is a relatively small range on both sides of the straight ahead position. In order to provide for securing approximate true rolling contact throughout this small but most-used range of operation, the straight ahead position of the steering linkage is preferably adjusted so that the axis D of the spindle 10 is perpendicular to the worm axis C in that position. The conical surface of the roller tooth 12 is such that its apex, in this straight ahead position, is slightly above the worm axis C, and also such that the apex lies on the worm axis C when the spindle axis D is turned to D' a few degrees, for example 2°, either side of the straight ahead position D. Throughout this most used range from D' to D' the arc A representing the path of movement of said apex is nearly coincident with the worm axis C and therefore approximate true rolling contact is secured in this important range of operation. The extent of the range D' to D' depends on the distance between worm axis C and rock shaft axis B, and also on the degree of approximate rolling contact desired for the particular motor vehicle. As the distance between worm axis C and rock shaft axis B is increased, the arc A approaches the straight line worm axis C with a consequent closer approximation of true rolling contact.

The helical groove on the worm 4 at the center of its length preferably has only slight pitch to insure that the gear will be substantially non-reversible in the straight ahead position and in the most used range slightly to either side of the straight ahead position. The non-reversible feature prevents transmission of vibration caused by road shocks and wheel shimmy to the steering wheel. It is also desirable that the pitch of the worm groove increase toward the ends of the worm in order that the motor vehicle wheels may be turned to their extreme positions by a reasonable movement of the steering wheel. This increased pitch likewise permits the wheels to more easily straighten themselves out after the vehicle has turned a sharp corner.

Although the construction described above is the preferred embodiment of the invention, it will be apparent that similar results can be obtained with the spindle positioned substantially vertically above the worm while the rock shaft remains below the worm as shown. In this form of the invention, the rock shaft is provided with an arm or arms extending upward around the worm to a hollowed-out head in which the spindle would be journalled. The worm in this construction would require to be convex rather than concave. In this modification, exactly the same approximation of true rolling contact is obtainable as with the described preferred embodiment.

Steering gears constructed in accordance with the present invention are efficient in operation because of the use of an adequately mounted long roller tooth and because of the substantial reduction of friction loss due to the utilization of approximate true rolling contact throughout the most used range of operation. The ease of operation of the gear provides for steering heavy vehicles and trucks with a minimum of effort. By providing that the tooth spindle pivot in a vertical plane containing the steering column axis, it results in a compact and narrow overall housing which is easily mounted on or removed from a vehicle having only a small space between the motor and the sideframe to which the gear is usually fastened. The small number and simplicity of the parts required for constructing this steering gear makes it possible to economically manufacture a sturdy device having a long life and unusual ability to withstand the stresses and shocks to which it is subjected.

This invention also contemplates the use of other types of bearings and connections than those described, as it will be apparent to the skilled mechanic that such variations are possible.

What I claim is:

1. A steering gear for motor vehicles and the like the combination comprising, a housing for the gear, a steering shaft for operating the gear, a worm within said housing and secured to said steering shaft, a rock shaft journalled in said housing and supported therein at right angles to the axis of said worm, a rotatable spindle carried by the rock shaft and journalled in the inner end thereof with the spindle axis intersecting the axes of said rock shaft and said steering shaft, and adjustable means for axially positioning said rock shaft in said housing to maintain the axis of said spindle in intersecting relation with the axis of said steering shaft, said spindle at one end having a truncated conical tooth engaging the worm whereby turning of the worm will rotate the rock shaft, the apex of the cone defining said conical tooth being adjacent and to one side of the worm axis when the spindle is perpendicular to said axis, the worm axis and the rock shaft axis being spaced apart a distance such that the conical tooth engages the worm with substantially true rolling contact in the most used sector of engagement.

2. A steering gear for motor vehicles and the like the combination comprising, a housing for the gear, a steering shaft for operating the gear, a worm within said housing and secured to said steering shaft, a rock shaft journalled in said housing and extending therein at right angles to the axis of said worm, a rotatable spindle carried by the rock shaft and journalled in the inner end thereof with the spindle axis intersecting the axes of said rock shaft and said steering shaft and normal to the former, and adjustable means for axially positioning said rock shaft in said housing to maintain the axis of said spindle in intersecting relation with the axis of said steering shaft, said spindle at one end having a truncated conical tooth engaging the worm whereby turning of the worm will rotate the rock shaft, the apex of the conical tooth surface being slightly displaced from the worm axis when the spindle is at right angles to the worm axis, the axis of the rock shaft being spaced from the axis of the worm by a distance effective to produce substantially true rolling contact between the truncated conical tooth and the worm over a range of the order of five degrees as these elements respond to turning movements of the steering shaft and in the most used sector of engagement between the spindle tooth and the worm.

3. A steering gear for motor vehicles and the like the combination comprising, a housing for the gear, a steering shaft journalled in said housing for operating the gear, a worm secured to and rotated by said shaft within the housing, a rock shaft journalled in said housing and extending therein at right angles to and spaced from the axis of the worm, an enlarged head member on the end of said rock shaft within the housing, said head being cored out in a direction normal to the rock shaft axis, a roller shaft or spindle element having a conical worm-engaging tooth, the said roller shaft being journalled in roller bearings carried by said head, the said bearings being spaced apart and located at opposite sides of the rock shaft axis, adjustable thrust bearings in contact with said head member for positioning and maintaining said member so that the axis of the said roller shaft intersects the worm axis, and the taper of said worm-engaging tooth and the distance between the worm axis and rock shaft axis being so chosen as to produce substantially true rolling contact between the tooth and the worm over a range of movement of the order of five degrees as these elements respond to turning movements of the steering shaft in the most used sector of engagement between the spindle tooth and the worm.

GEORGE A. GEMMER.